(12) United States Patent
Sperber et al.

(10) Patent No.: US 7,389,406 B2
(45) Date of Patent: Jun. 17, 2008

(54) APPARATUS AND METHODS FOR UTILIZATION OF SPLITTABLE EXECUTION UNITS OF A PROCESSOR

(75) Inventors: Zeev Sperber, Zichron Yaakov (IL); Guillermo Savransky, Haifa (IL); Sagi Lahav, Kiryat Motzkin (IL)

(73) Assignee: Intel Corporation, Santa Clara, CA (US)

( * ) Notice: Subject to any disclaimer, the term of this patent is extended or adjusted under 35 U.S.C. 154(b) by 569 days.

(21) Appl. No.: 10/950,690

(22) Filed: Sep. 28, 2004

(65) Prior Publication Data
US 2006/0095740 A1 May 4, 2006

(51) Int. Cl.
*G06F 9/30* (2006.01)
(52) U.S. Cl. .................................................. 712/221
(58) Field of Classification Search .................. 712/22, 712/220, 216, 217, 221, 215

See application file for complete search history.

(56) References Cited

U.S. PATENT DOCUMENTS

| 6,154,831 | A | * | 11/2000 | Thayer et al. | 712/208 |
| 7,062,635 | B2 | * | 6/2006 | Bosshart | 712/218 |
| 7,149,877 | B2 | * | 12/2006 | Dhong et al. | 712/22 |
| 2002/0010847 | A1 | | 1/2002 | Abdallah et al. | |
| 2003/0061523 | A1 | * | 3/2003 | Stanley | 713/300 |
| 2004/0003205 | A1 | * | 1/2004 | Akiu et al. | 712/215 |
| 2004/0015773 | A1 | * | 1/2004 | D'Arcy et al. | 714/786 |
| 2004/0181564 | A1 | * | 9/2004 | MacInnis et al. | 708/322 |

* cited by examiner

*Primary Examiner*—Eric Coleman
(74) *Attorney, Agent, or Firm*—Pearl Cohen Zedek Latzer LLP (57) ABSTRACT

A partial execution unit of a splittable execution unit performs an operation on a portion of one or more arguments of a micro-operation to generate a first partial execution result of the micro-operation. A complementary portion of one of the arguments is passed through a bypass execution unit instead of through the splittable execution unit to generate a second partial execution result of the micro-operation. The first partial execution result and second partial execution result are concatenated into a full execution result.

38 Claims, 6 Drawing Sheets

APPARATUS AND METHODS FOR UTILIZATION OF SPLITTABLE EXECUTION UNITS OF A PROCESSOR

BACKGROUND OF THE INVENTION

Processors may include different types of execution units (EU), each dedicated and optimized for performing specific tasks. For example, a processor may include an integer EU for manipulating operands in integer format, a floating point EU for manipulating operands in floating point format and a multimedia EU for performing specific multimedia and communication instructions, such as, for example, Multi Media extensions (MMX™) instructions. Moreover, processors may also have more than one EU of each type.

A processor having more than one execution unit may employ out-of-order (OOO) techniques in order to use the execution units in an efficient manner. An instruction in a system memory, when processed by the processor, is decoded into one or more micro-operations ("u-ops"). Each u-op is to be executed by an OOO subsystem of the processor. The OOO subsystem enables more than one u-op to be executed at the same time, although the u-ops may be executed in a different order than the order in which they were received by the OOO subsystem.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail for clarity.

Embodiments of the invention may be used in any apparatus having a processor. For example, the apparatus may be a portable device that is powered by a battery. A non-exhaustive list of examples of such portable devices includes laptop and notebook computers, mobile telephones, personal digital assistants (PDA), and the like. Alternatively, the apparatus may be a non-portable device, such as, for example, a desktop computer or a server computer.

According to embodiments of the invention, a processor may include a splittable execution unit that includes two partial execution units. The splittable execution unit may be able to execute operations on arguments, that may include, for example, 128 bits, and to generate complete execution results having the same number of bits as the arguments.

A first partial execution unit may be able to receive a first part of the arguments and to generate a first part of the execution result, and the second partial execution unit may be able to receive a second part of the arguments, that is complementary to the first part, and may be able to generate a complementary second part of the execution result.

In some of the operations that the splittable execution unit may be able to perform, the second part of the execution result may be relatively simple to generate, and may equal to, for example, the second part of one of the arguments or to a constant, defined by the specific operation.

According to embodiments of the invention, a processor may include additional, relatively simple, execution units, capable of performing the relatively simple operations required for generating the second part of the execution result. Such relatively simple execution units may be able, for example, to receive bits of an argument and to output the bits after a defined delay, or may be able to output constants.

According to embodiments of the invention a processor may be able to direct such operations to be performed in one partial execution unit and one such additional execution unit, instead of in two partial execution units. In addition, one pair of a partial execution unit and a first additional execution unit may be able to perform an operation at least partly concurrently with a second pair of another partial execution unit and a second additional execution unit performing another operation.

Figure 1:
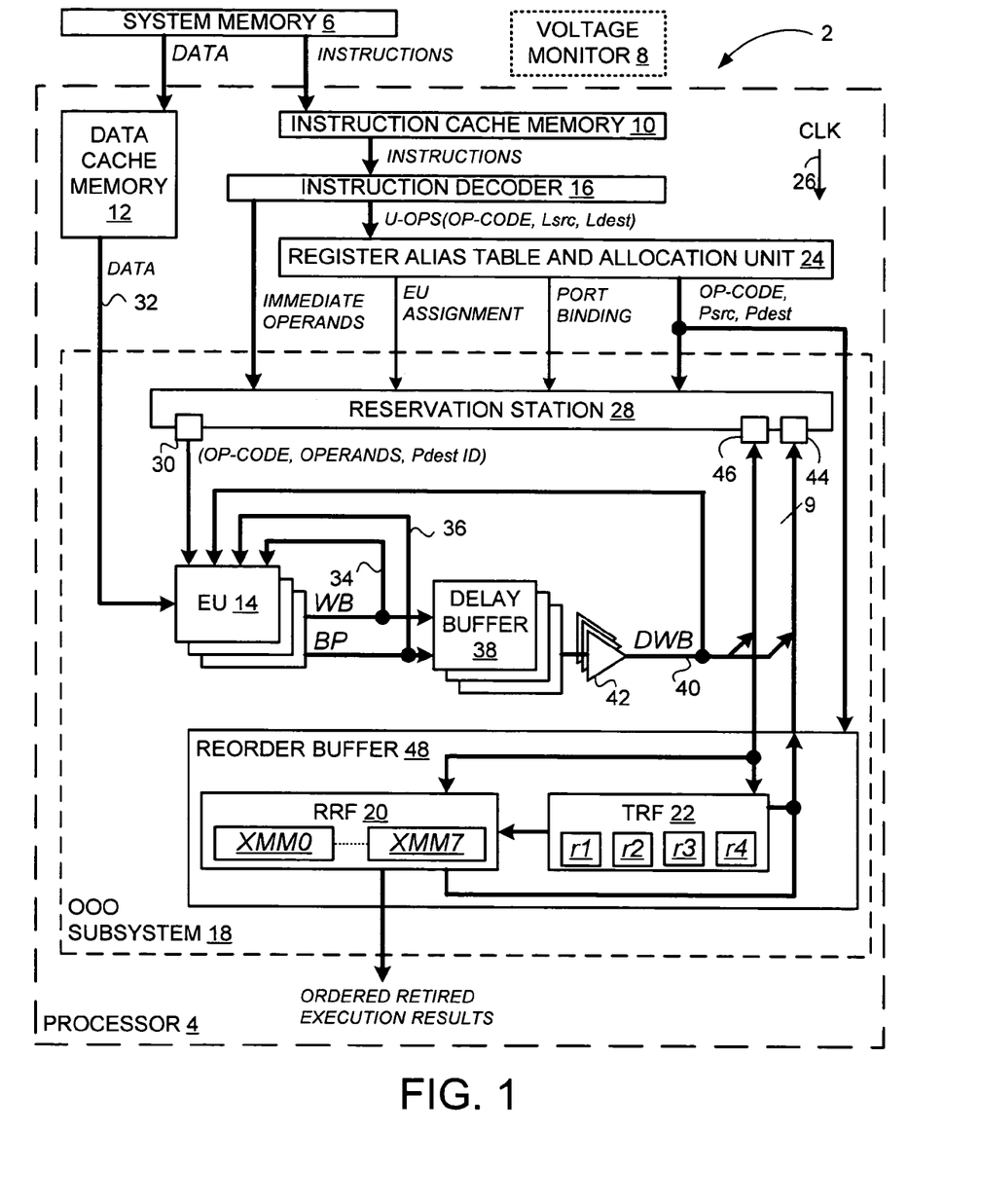
FIG. 1 is a block diagram of an apparatus having a processor according to an embodiment of the invention, the processor having an OOO subsystem that has a reservation station and a reorder buffer.

As shown in FIG. 1, an apparatus 2 may include a processor 4 and a system memory 6, and may optionally include a voltage monitor 8 to at least monitor voltage supply to processor 4. Well-known components and circuits of apparatus 2 and of processor 4 are not shown in FIG. 1 for clarity.

Design considerations, such as, but not limited to, processor performance, cost and power consumption, may result in a particular processor design, and it should be understood that the design of processor 4 shown in FIG. 1 is merely an example and that embodiments of the invention are applicable to other processor designs as well.

A non-exhaustive list of examples for processor 4 includes a central processing unit (CPU), a digital signal processor (DSP), a reduced instruction set computer (RISC), a complex instruction set computer (CISC) and the like. Moreover, processor 4 may be part of an application specific integrated circuit (ASIC) or may be part of an application specific standard product (ASSP).

A non-exhaustive list of examples for system memory 6 includes a dynamic random access memory (DRAM), a synchronous dynamic random access memory (SDRAM), a flash memory, a double data rate (DDR) memory, RAMBUS dynamic random access memory (RDRAM) and the like. Moreover, system memory 6 may be part of an application specific integrated circuit (ASIC) or may be part of an application specific standard product (ASSP).

System memory 6 may store instructions to be executed by processor 4. Instructions retrieved from system memory 6 may be stored temporarily in an instruction cache memory 10 of processor 4. System memory 6 may also store data for the instructions, or the data may be stored elsewhere. Data for the instructions retrieved from system memory 6 or elsewhere may be stored temporarily in a data cache memory 12 of processor 4.

Processor 4 may comprise one or more EUs 14, and processor 4 may employ OOO techniques in order to use EU(s) 14 in an efficient manner.

An instruction decoder (ID) 16 may decode an instruction into one or more micro-operations ("u-ops") depending on the type of instruction or according to some other criterion. Each u-op may be executed by an OOO subsystem 18 of the processor. OOO subsystem 18 enables more than one u-op to be executed at the same time, although the u-ops may be executed in a different order than the order in which they were received by OOO subsystem 18.

OOO subsystem 18 may include a real register file (RRF) 20 having a set of architectural registers for storing execution results of u-ops in the order in which the u-ops were received by OOO subsystem 18 (storing the execution result of a u-op in an architectural register is called "retiring" the u-op). The architectural registers of RRF 20 may include, for example, eight architectural register denoted XMM0-XMM7, although RRF 20 may include any other architectural registers.

OOO subsystem 18 may include a temporary register file (TRF) 22 having a set of temporary registers for storing execution results until such time as those results may be stored in the architectural registers. The temporary registers of TRF 22 may include, for example, four temporary registers denoted r1, r2, r3 and r4, although TRF 22 may include any other temporary registers.

The Register Alias Table and Allocation Unit

A u-op may include an "op-code", may optionally include one or more "logical sources" (Lsrc), may optionally include one or more immediate operands, and may optionally include one "logical destination" (Ldest). An op-code is a field of the u-op that defines the type of operation to be performed on operands of the u-op. An immediate operand is an operand that is embedded in the u-op, and a logical source is an identifier of an architectural register where an operand is to be found. A logical destination is an identifier of an architectural register to receive and store the execution result of the u-op once the u-op is retired.

Processor 4 may include a register alias table and allocation unit (RAT/ALLOC) 24. RAT/ALLOC 24 may receive u-ops from ID 16, and may "allocate" physical destinations (Pdest) in OOO subsystem 18 to store the execution results of the u-ops until the results are retired. Physical destinations may be, for example, temporary registers of TRF 22 or architectural registers of RRF 20.

In addition, RAT/ALLOC 24 may identify physical sources in OOO subsystem 18 that store values that are needed as operands to the u-ops. RAT/ALLOC 24 may "rename" logical sources of the u-op with identifiers of the physical sources (Psrc). Physical sources may be, for example, temporary registers of TRF 22 and/or architectural registers of RRF 20.

Moreover, RAT/ALLOC 24 may assign for each renamed/allocated u-op which of EU(s) 14 is to execute the op-code. Furthermore, as described hereinbelow, RAT/ALLOC 24 may bind a dispatch port to dispatch the renamed/allocated u-op to the assigned EU(s) 14.

At each cycle of a clock 26, ID 16 may receive, at most three instructions from instruction cache memory 10 and may output at most six u-ops from previously received instructions. At each cycle of clock 26, RAT/ALLOC 24 may receive at most six u-ops from ID 16 and may output to OOO subsystem 18 at most three renamed/allocated u-ops and their corresponding EU assignments and dispatch port bindings. (In other embodiments, the limit of instructions received by the instruction decoder per clock cycle from the instruction cache memory may be other than three.

Similarly, in other embodiments, the limit of u-ops output by the instruction decoder per clock cycle may be other than six. In other embodiments, the limit of u-ops received by the RAT/ALLOC per clock cycle from the instruction decoder may be other than six. Similarly, in other embodiments, the limit of renamed/allocated u-ops and corresponding EU assignments output by the RAT/ALLOC per clock cycle to OOO subsystem 18 may be other than three.)

The Reservation Station and Propagation Paths for Execution Results

OOO subsystem 18 may include a reservation station (RS) 28 that, at each cycle of clock 26, may receive from RAT/ALLOC 24 and store internally at most three renamed/allocated u-ops and their EU(s) assignments. (In other embodiments, the limit of renamed/allocated u-ops received by RS 28 per clock cycle may be other than three). In addition RS 28 may receive immediate operands from ID 16.

RS 28 may dispatch a u-op to one or more assigned EU(s) via one or more bound dispatch ports 30. A u-op dispatched by RS 28 may contain an op-code, operands and an identifier of the physical destination of the renamed/allocated u-op. RS 28 may select assigned EU(s) according to, for example, the EU(s) assignments received from RAT/ALLOC 24 and/or according to other criteria, if any.

The one or more assigned EU(s) may receive the dispatched u-op, may optionally receive one or more operands for the u-op from data cache memory 12 over, for example, signals 32, and may execute the dispatched u-op.

If, for example, one EU is assigned to execute a u-op, it may apply one or more operations to the operands and may generate a complete execution result of the u-op.

In another example, two EUs may be assigned to execute a u-op. One assigned EU may receive the op-code and, for example, the most significant bits (MSB) of the operands, and may generate a partial execution result, that may be, for example, the MSB of the complete execution result of the u-op. The other assigned EU may receive the op-code and, for example, the less significant bits (LSB) of the operands, and may generate a partial execution result, that may be, for example, the LSB of the complete execution result of the u-op.

Some of EUs 14 may be able to output complete or partial execution results to one or more write-back (WB) buses 34, and other EUs 14 may be able to output complete or partial execution results to one or more bypass (BP) buses 36. Accordingly, the assigned EU(s) may output the partial/complete execution results to WB buses 34 and/or to BP buses 36.

OOO subsystem 18 may include one or more delay buffers 38, to receive partial/complete execution results from WB buses 34 and/or from BP buses 36 and to store the partial/complete execution results for at least one cycle of clock 26. Delay buffers 38 may delay different partial/complete execution results with different numbers of cycles of clock 26.

Delay buffers 38 may output partial/complete execution results to one or more delayed-write-back buses (DWB) 40 through, for example, tri-state buffers 42. Partial/complete execution results stored in delay buffers 38 may be present on DWB buses 40 one or more cycles of clock 26 after the partial/complete execution results are presented on WB buses 34 or BP buses 36.

A particular u-op may be "ready-for-dispatching" from RS 28 once all of the operands of the particular u-op are available to be dispatched to the assigned EU(s). RS 28 may dispatch a ready-for-dispatching u-op while routing operands to the assigned EU(s) from where the operands are available.

For example, partial/complete execution results may be available as operands for u-ops from WB buses 34 and/or BP buses 36. In addition, complete execution results may be available as operands for u-ops from dispatch ports 30 and/or from DWB buses 40.

RS 28 may dispatch a u-op to one or more assigned EU(s) only if certain resources are available and any other conditions, if any, are met. A non-exhaustive list of the resources RS 28 may check for availability includes the assigned EU(s), dispatch ports 30, WB buses 34, BP buses 36, and DWB buses 40. RS 28 may check that the assigned EU(s) are available to execute the op-code of the particular u-op, that dispatch ports 30 have the capacity to carry the op-codes, operands and the Pdest identifier of the particular u-op, and that WB buses 34, BP buses 36, and DWB buses 40 will be available to carry the partial/complete execution results of the particular u-op once the partial/complete execution results are calculated.

RS 28 may include several input ports 44, for example, nine input ports 44, to receive operands on allocation from TRF 22, RRF 20, or from elsewhere. In addition, RS 28 may include an input port 46 to receive operands that are execution results of other u-ops from DWB buses 40 and/or from BP buses 36 or from elsewhere.

RS 28 may store and handle more than one u-op at a time. The conditions for execution of one u-op may be fulfilled before the conditions for execution of a u-op that was received earlier. Consequently, u-ops may be dispatched and executed in an order that may be different from the order in which they were received by OOO subsystem 18.

The Reorder Buffer

OOO subsystem 18 may include a reorder buffer (ROB) 48, and TRF 22 and RRF 20 may be included in ROB 48. ROB 48 may receive the allocated u-ops from RAT 24 in the same order that they are sent to RS 28, and may store the allocated u-ops in a queue. Entries in the queue may be associated with temporary registers of TRF 22.

ROB 48 may receive execution results from DWB buses 40, and may store the execution results in the physical destinations at TRF 22 until the u-ops are retired to RRF 20. A particular u-op is "valid-for-retiring" if its execution results are available for retiring and other conditions, if any, have been satisfied. ROB 48 may then retire the valid-for-retiring u-ops according to the original order of u-ops and may store their execution results in the architectural registers of RRF 20.

For example, an execution result to be retired may be stored in TRF 22, and ROB 48 may retire the execution result from TRF 22 to RRF 20. Alternatively, an execution result to be retired may be stored in delay buffer 38, and ROB 48 may retire the execution result from delay buffer 38 to RRF 20.

At each cycle of clock 26, ROB 48 may retire at most three "valid for retiring" u-ops. (In other embodiments, the limit of u-ops retired by ROB 48 per clock cycle may be other than three.) No u-ops will be retired until the u-op that is next to be retired according to the original order of u-ops is valid-for-retiring.

Execution of SIMD Operations in Splittable Execution Units

Processors, such as processor 4, may include different types of execution units 14, each dedicated and optimized for performing specific tasks. Moreover, processors, such as processor 4, may also have more than one EU of each type. A non-exhaustive list of examples for an execution unit includes:

a floating point EU, such as an adder or a multiplier, for manipulating operands in floating point format;

an integer EU for manipulating operands in integer format;

a multimedia EU for performing specific multimedia and communication instructions, such as, for example, Multi Media extensions (MMX™) and streaming single instructions (SSE™);

a barrel shifter EU, a multiplier EU, an arithmetic logic unit (ALU) EU, a jump EU for executing program branches, a load EU for loading data from memory, a store EU for storing data in memory, and the like.

In the specification, the term SSE™ is intended to include all extensions of SSE™, for example, SSE2™ and SSE3™.

Packed and scalar SSE™ operations may be executed on 128-bit arguments of single-instruction-multiple-data (SIMD) SSE™ data type. A typical packed or scalar SSE™ operation may be executed on two 128-bit arguments that may each include, for example, two double-precision (64-bits) floating point operands, four single-precision (32-bits) floating point operands, sixteen 8-bits integer operands, eight 16-bits integer operands, four 32-bits integer operands or two 64-bits integer operands.

A typical complete SSE™ execution result may contain 128-bit representing data of the same type as of the operands. With packed SSE™ operations, each of the operands may be operated on, for example, by an operator such as addition, and the complete execution result may reflect the result of the operation on each of the operands. With scalar SSE™ operations, an operator may be applied only to the operands in the LSB of the arguments. The complete execution result may contain the result of the operation on the LSB operands and may contain the complimentary most significant bits (MSB) of one of the arguments.

A packed integer (floating point) SSE™ operation may be performed in a 128-bit splittable integer (floating point) EU. A splittable integer (floating point) EU may contain two partial integer (floating point) EUs that may be able to independently perform operations on 64 bits of the arguments. One partial integer (floating point) EU may receive the 64 LSB of the arguments and may generate a partial execution result which is the 64 LSB of the complete execution result. The other partial integer (floating point) EU may receive the 64 MSB of the arguments and may generate a partial execution result which is the 64 MSB of the complete execution result.

Similarly, a scalar SSE™ operation on floating point operands may be performed in the 128-bit splittable floating point EU. One partial floating point EU may receive the 64 LSB of the arguments and may generate a partial execution result which is the 64 LSB of the complete execution result. The other partial floating point EU may receive the 64 MSB of the arguments and may output the received 64 bits as a partial execution result which is the 64 MSB of the complete execution result.

According to some embodiments of the invention, in scalar operations on floating point operands of SSE™ data type, a bypass EU may perform the bypass operation instead of one of the partial EUs. A bypass EU may be less complex than the partial EU, and may consume less power for performing the bypass operation.

Moreover, according to some embodiments of the invention, two distinct scalar SSE™ operations may be performed at least partially concurrently in a 128-bit splittable floating point EU, while two bypass EUs bypass the corresponding complementary MSB of selected ones of the arguments.

Although embodiments of the invention are not limited in this respect, the instructions to perform SSE™ operations may be "register-to-register" or "register-to-memory" instructions. A register-to-register instruction may have its operands available in registers of processor 4, for example, registers XMM0 to XMM7 of RRF 20.

A register-to-memory instruction may be similar to a register-to-register instruction in that one of its operands may be available in a register of processor 4. However, the other operand of the register-to-memory instruction may be stored in system memory 6 or in data cache memory 12 or elsewhere. The operand stored in data cache memory 12 may be fetched by one or more memory interface execution units (not shown) into a register of processor 4 before the execution continues as with a register-to-register instruction.

For clarity, the description is directed to scalar and packed SSE™ operations. However, embodiments of the invention are applicable to any other operations, such as MMX™ operations.

Co-Operation of Splittable and Bypass Execution Units

Figure 2:
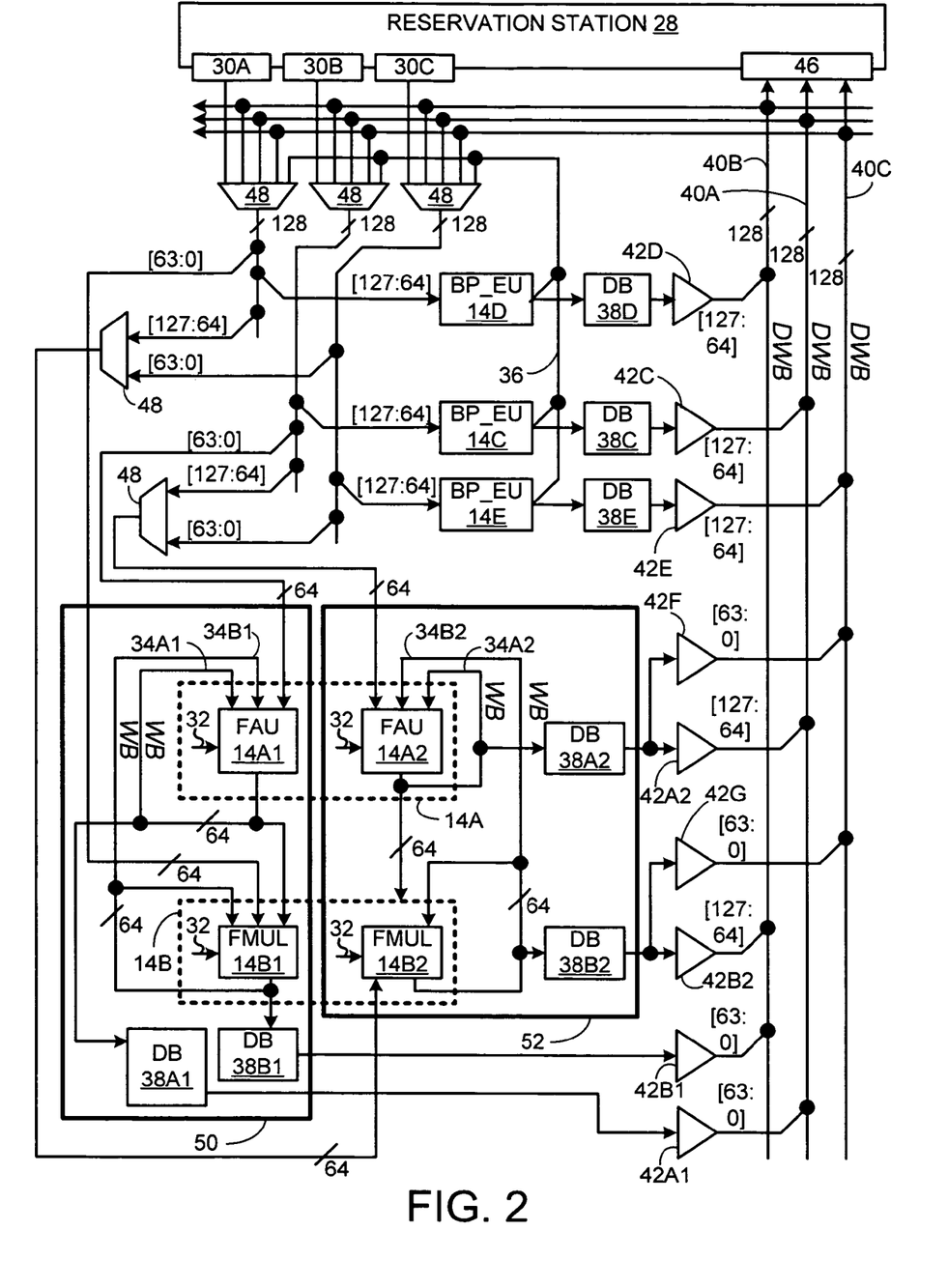
FIG. 2 is a block diagram showing connectivity of exemplary execution units in an OOO subsystem of a processor, according to some embodiments of the invention.

FIG. 2 is a block diagram showing connectivity of exemplary execution units in OOO subsystem 18, according to some embodiments of the invention. Two "splittable" execution units are shown: a splittable floating point adder unit (FAU) 14A and a splittable floating point multiplier (FMUL) 14B.

Splittable FAU 14A may include two partial 64-bits floating point adder units (FAU) 14A1 and 14A2, each able to perform operations, such as floating point (FP) addition, FP subtraction and FP comparison on double-precision and/or single-precision floating point operands.

Splittable FAU 14A may be able to perform packed and scalar SSE™ operations on 128-bit arguments. For example, splittable FAU 14A may receive two 128-bit SSE™ arguments that may contain, for example, double-precision or single-precision floating point operands, may perform packed or scalar SSE™ operations on the arguments and may output a respective complete 128-bit execution result.

FAU 14A1 may receive the 64 LSB of the two arguments and may output a partial execution result which is the 64 LSB of the complete execution result. In addition, FAU 14A2 may receive the 64 MSB of the two arguments and may output another partial execution result, which is the 64 MSB of the complete execution result. For scalar SSE™ operations on 128-bit arguments, the 64 MSB of the complete execution result may equal the 64 MSB of one of the arguments.

FAU 14A2 may output the 64 MSB of the complete execution result to a WB bus 34A2 while FAU 14A1 outputs the 64 LSB of the complete execution result to a WB bus 34A1. A delay buffer 38A1 may receive the 64 LSB of the complete execution result from WB bus 34A1 and may store the 64 LSB of the complete execution result. Similarly, a delay buffer 38A2 may receive the 64 MSB of the complete execution result from WB bus 34A2 and may store the 64 MSB of the complete execution result.

Delay buffers 38A1 and 38A2 may jointly output the complete execution result through, for example, tri-state buffers 42A1 and 42A2 to a DWB bus 40A, and from there, the complete execution result may propagate to, for example, port 46 of RS 28.

Splittable FMUL 14B may include two partial 64-bits floating point multiplier units (FMUL) 14B1 and 14B2, each able to perform operations, such as FP multiplication, FP division and FP square root on double-precision and/or single-precision floating point operands.

Splittable FMUL 14B may be able to perform packed and scalar SSE™ operations on 128-bit arguments. For example, splittable FMUL 14B may receive two 128-bit arguments of SSE™ data type that may contain, for example, double-precision or single-precision floating point operands, may perform packed or scalar operations on the arguments and may output a respective complete 128-bit execution result.

FMUL 14B1 may receive the 64 LSB of the two arguments and may output a partial execution result which is the 64 LSB of the complete execution result. In addition, FMUL 14B2 may receive the 64 MSB of the two arguments and may output another partial execution result, which is the 64 MSB of the complete execution result. For scalar SSE™ operations on 128-bit arguments, the 64 MSB of the complete execution result may equal the 64 MSB of one of the arguments.

FMUL 14B2 may output the 64 MSB of the complete execution result to a WB bus 34B2 while FMUL 14B1 outputs the 64 LSB of the complete execution result to a WB bus 34B1. A delay buffer 38B1 may receive the 64 LSB of the complete execution result from WB bus 34B1 and may store the 64 LSB of the complete execution result. Similarly, a delay buffer 38B2 may receive the 64 MSB of the complete execution result from WB bus 34B2 and may store the 64 MSB of the complete execution result.

Delay buffers 38B1 and 38B2 may jointly output the complete execution result through, for example, tri-state buffers 42B1 and 42B2 to a DWB bus 40B, and from there, the complete execution result may propagate to, for example, port 46 of RS 28.

FAU 14A may be able to receive 128-bit SSE™ arguments from, for example, signals 32, DWB bus 40A, DWB bus 40B and a dispatch port 30B. FAU 14A1 may be able to receive the 64 LSB of the 128-bit arguments and FAU 14A2 may be able to receive the 64 MSB of the 128-bit arguments.

In addition, FAU 14A1 may be able to receive 64-bit partial execution results from, for example, WB bus 34A1 and WB bus 34B1 as the 64 LSB of 128-bit arguments, and FAU 14A2 may be able to receive 64-bit partial execution results from WB bus 34A2 and WB bus 34B2 as the 64 MSB of 128-bit arguments.

FMUL 14B may be able to receive 128-bit SSE™ arguments from, for example, signals 32, DWB bus 40A, DWB bus 40B and a dispatch port 30A. FMUL 14B1 may be able to receive the 64 LSB of the 128-bit arguments and FAU 14A2 may be able to receive the 64 MSB of the 128-bit arguments.

In addition, FMUL 14B1 may be able to receive 64-bit partial execution results from, for example, WB bus 34A1 and WB bus 34B1 as the 64 LSB of 128-bit arguments, and FMUL 14A2 may be able to receive 64-bit partial execution results from WB bus 34A2 and WB bus 34B2 as the 64 MSB of 128-bit arguments.

Routing blocks 48, that may be, for example, multiplexers, wired-OR blocks, tri-state blocks or any combination thereof, may route arguments from DWB buses 40A, 40B and dispatch ports 30A, 30B to FAU 14A1, FAU 14A2, FMUL 14B1 and FMUL 14B2.

In a first exemplary scenario, FAU 14A may be assigned to execute a first u-op that defines one or more scalar SSE™ operations on 128-bit arguments, and dispatch port 30B may be bound to dispatch the first u-op. FAU 14A1 and FAU 14A2 may receive the op-code of the first u-op from dispatch port 30B. In addition, FAU 14A1 may receive the 64 LSB of the arguments from dispatch port 30B or from elsewhere, and FAU 14A2 may receive the 64 MSB of the arguments from dispatch port 30B or from elsewhere.

FAU 14A1 may perform the one or more operations defined by the first op-code and may output a 64-bit partial execution result that is the 64 LSB of the complete execution result of the first u-op. FAU 14A2 may output the 64 MSB of one of the arguments as the 64 MSB of the complete execution result of the first u-op while FAU 14A1 outputs its 64-bit partial execution result. The complete 128-bit execution result of the first u-op may be received by DWB bus 40A through tri-state buffers 42A1 and 42A2.

In a second exemplary scenario, FMUL 14B may be assigned to execute a second u-op that defines one or more scalar SSE™ operations on 128-bit arguments, and dispatch port 30A may be bound to dispatch the second u-op. FMUL 14B1 and FMUL 14B2 may receive the op-code of the second u-op from dispatch port 30A. In addition, FMUL 14B1 may receive the 64 LSB of the arguments from dispatch port 30A or from elsewhere, and FMUL 14B2 may receive the 64 MSB of the arguments from dispatch port 30A or from elsewhere.

FMUL 14B1 may perform the one or more operations defined by the second op-code and may output a 64-bit partial execution result that is the 64 LSB of the complete execution result of the second u-op. FMUL 14B2 may output the 64 MSB of one of the arguments as the 64 MSB of the complete execution result of the second u-op while FAU 14A1 outputs its 64-bit partial execution result. The complete 128-bit execution result of the second u-op may be received by DWB bus 40B through tri-state buffers 42B1 and 42B2.

According to some embodiments of the invention, OOO subsystem 18 may include bypass execution units (BP_EU) 14C and 14D and tri-state buffers 42C and 42D. BP_EU 14C (BP_EU 14D), like FAU 14A2 (FMUL 14B2), may be able to receive, through routing blocks 48, the 64 MSB of DWB bus 40A, the 64 MSB of DWB bus 40B, and the 64 MSB of dispatch port 30B (30A). BP_EU 14C (14D) may be able to delay the received 64-bits for a selectable number of cycles of clock 26, and to output a delayed version of the 64 bits.

The 64-bit outputs of BP_EU 14C and BP_EU 14D may be coupled by BP buses 36 to routing blocks 48, and may be additional possible sources for the 64 MSB of arguments to FAU 14A2, FMUL 14B2, BP_EU 14C and BP_EU 14D. In addition, the 64-bit outputs of BP_EU 14C and BP_EU 14D may be received by delay buffers 38C and 38D, respectively.

Outputs of delay buffers 38C and 38D may be coupled to the 64 MSB of DWB buses 40A and 40B, respectively, through tri-state buffers 42C and 42D, respectively.

For operations, in which FAU 14A2 (FMUL 14B2) is ought to merely propagate 64-bit wide values, BP_EU 14C (BP_EU 14D) may be able to perform the propagation instead of FAU 14A2 (FMUL 14B2). Power consumed in BP_EU 14C (BP_EU 14D) while propagating a 64-bit wide value for a particular number of cycles of clock 26 may be lower than the power consumed by FAU 14A2 (FMUL 14B2) for propagating the same value for the same number of cycles of clock 26. Therefore, power consumption of processor 4 may be reduced.

In a third exemplary scenario, FAU 14A1 and BP_EU 14C may be assigned to execute the first u-op (of the first scenario), and dispatch port 30B may be bound to dispatch the first u-op. FAU 14A1 and BP_EU 14C may receive the op-code of the first u-op from dispatch port 30B. In addition, FAU 14A1 may receive the 64 LSB of the arguments from dispatch port 30B or from elsewhere, and BP_EU 14C may receive the 64 MSB of the arguments from dispatch port 30B or from elsewhere.

FAU 14A1 may perform the one or more operations defined by the first op-code and may output a 64-bit partial execution result that is the 64 LSB of the complete execution result of the first u-op. BP_EU 14C may output the 64 MSB of one of the arguments as the 64 MSB of the complete execution result of the first u-op while FAU 14A1 outputs its 64-bit partial execution result. The complete 128-bit execution result of the first u-op may be received by DWB bus 40A through tri-state buffers 42A1 and 42C.

In a fourth exemplary scenario, FMUL 14B$_1$ and BP_EU 14D may be assigned to execute the second u-op (of the second scenario), and dispatch port 30A may be bound to dispatch the second u-op. FMUL 14B1 and BP_EU 14D may receive the op-code of the second u-op from dispatch port 30A. In addition, FMUL 14B1 may receive the 64 LSB of the arguments from dispatch port 30A or from elsewhere, and BP_EU 14D may receive the 64 MSB of the arguments from dispatch port 30A or from elsewhere.

FMUL 14B1 may perform the one or more operations defined by the second op-code and may output a 64-bit partial execution result that is the 64 LSB of the complete execution result of the second u-op. BP_EU 14D may output the 64 MSB of one of the arguments as the 64 MSB of the complete execution result of the second u-op while FMUL 14B1 outputs its 64-bit partial execution result. The complete 128-bit execution result of the second u-op may be received by DWB bus 40B through tri-state buffers 42B1 and 42D.

As previously discussed, exemplary operations, in which BP_EU 14C (BP_EU 14D) may be able to replace FAU 14A2 (FMUL 14B2), are scalar FP SSE™ operations performed on 128-bit arguments. It should be understood that in a similar manner, bypass execution units such as exemplary BP_EU 14C and 14D may be able to replace partial execution units of splittable execution units for bypassing bits in operations performed on any other data types.

According to some embodiments of the invention, as described hereinbelow, a splittable EU, such as FAU 14A or FMUL 14B, may be able to at least partly concurrent execute two distinct scalar SSE™ operations.

According to some embodiments of the invention, OOO subsystem 18 may include a bypass execution unit 14E. BP_EU 14E may be able to receive, through routing blocks 48, at least the 64 MSB of DWB buses 40C and the 64 MSB of a dispatch port 30C. BP_EU 14E may be able to delay the received 64-bits for a selectable number of cycles of clock 26, and to output a delayed version of the 64 bit.

The 64-bit output of BP_EU 14E may be coupled by BP buses 36 to routing blocks 48, and may be an additional possible source for the 64 MSB of arguments to FAU 14A2, FMUL 14B2, BP_EU 14C, BP_EU 14D and BP_EU 14E.

In addition, the 64-bit output of BP_EU 14E may be received by a delay buffer 38E, and the outputs of delay buffer 38E may be coupled to the 64 MSB of DWB bus 40C through a tri-state buffer 42E. Moreover, OOO subsystem 18 may include tri-state buffers 42F and 42G to couple the outputs of DB 38A2 and DB 38B2, respectively, to the LSB of a DWB bus 40C.

In a fifth exemplary scenario, in addition to the described in the third exemplary scenario, FAU 14A2 and BP_EU 14E may be assigned to execute an additional scalar SSE™ u-op that defines one or more operations on 128-bit arguments, and dispatch port 30C may be bound to dispatch the other u-op. FAU 14A2 and BP_EU 14E may receive the op-code of the other u-op from dispatch port 30C. In addition, FAU 14A2 may receive the 64 LSB of the arguments from dispatch port 30C or from elsewhere, and BP_EU 14E may receive the 64 MSB of the arguments from dispatch port 30C or from elsewhere.

FAU 14A2 may perform the one or more operations defined by the other op-code and may output a 64-bit partial execution result that is the 64 LSB of the complete execution result of the other u-op. BP_EU 14E may output the 64 MSB of one of the arguments as the 64 MSB of the complete execution result of the other u-op while FAU 14A2 outputs its 64-bit partial execution result. The complete 128-bit execution result of the other u-op may be received by DWB bus 40C through tri-state buffers 42E and 42F. The first and the other u-ops may be executed at least partly concurrently as the execution of each of the u-ops requires different resources of OOO subsystem 18.

In a sixth exemplary scenario, in addition to the described in the fourth exemplary scenario, FMUL 14B2 and BP_EU 14E may be assigned to execute an additional scalar SSE™ u-op that defines one or more operations on 128-bit arguments, and dispatch port 30C may be bound to dispatch the other u-op. FMUL 14B2 and BP_EU 14E may receive the op-code of the other u-op from dispatch port 30C. In addition, FMUL 14A2 may receive the 64 LSB of the arguments from dispatch port 30C or from elsewhere, and BP_EU 14E may receive the 64 MSB of the arguments from dispatch port 30C or from elsewhere.

FMUL 14B2 may perform the one or more operations defined by the other op-code and may output a 64-bit partial execution result that is the 64 LSB of the complete execution result of the other u-op. BP_EU 14E may output the 64 MSB of one of the arguments as the 64 MSB of the complete execution result of the other u-op while FMUL 14B2 outputs its 64-bit partial execution result. The complete 128-bit execution result of the other u-op may be received by DWB bus 40C through tri-state buffers 42E and 42G. The first and the other u-ops may be executed at least partly concurrently as the execution of each of the u-ops requires different resources of OOO subsystem 18.

The Bypass Execution Units

Some operations in FAU 14A1 and FMUL 14B1 may be fully pipelined, and may propagate through stages of FAU 14A or FMUL 14B in regular time intervals of, for example, one cycle of clock 26. Consequently, FAU 14A1 and FMUL 14B1 may be able to receive new u-ops with such operations at consecutive time intervals that equal the regular time intervals, and may be able to output execution results at consecutive time intervals that equal the regular time intervals.

Other operations in FAU 14A1 and/or FMUL 14B1 may not be fully pipelined, and may propagate through stages of FAU 14A and/or FMUL 14B in non-regular time intervals. For example, operations such as division or square root may be delayed for twenty time intervals in one stage of FMUL 14B1, and may be delayed for one time interval in each of two other stages of FMUL 14B1.

To support the operations described hereinabove, bypass EUs 38C, 38D and 38C may be able to receive new u-ops while FAU 14A1 and/or FMUL 14B1 receive the u-ops, and to appropriately delay the partial execution results it receive.

EUs 38C, 38D and 38C may be, for example, a shift-register with a variable number of stages and/or variable lengths of delays for the stages, that may both be selectable according to the u-ops received by EUs 38C, 38D and 38C. Alternatively, EUs 38C, 38D and 38C may include, for example, a random access memory. Partial execution results may be received and stored in entries of the random access memory and a control circuitry may control the time in which the individual partial execution results are outputted from EUs 38C, 38D and 38C.

Resolving Potential Future Resource Conflicts at Dispatch Level

Figure 3:
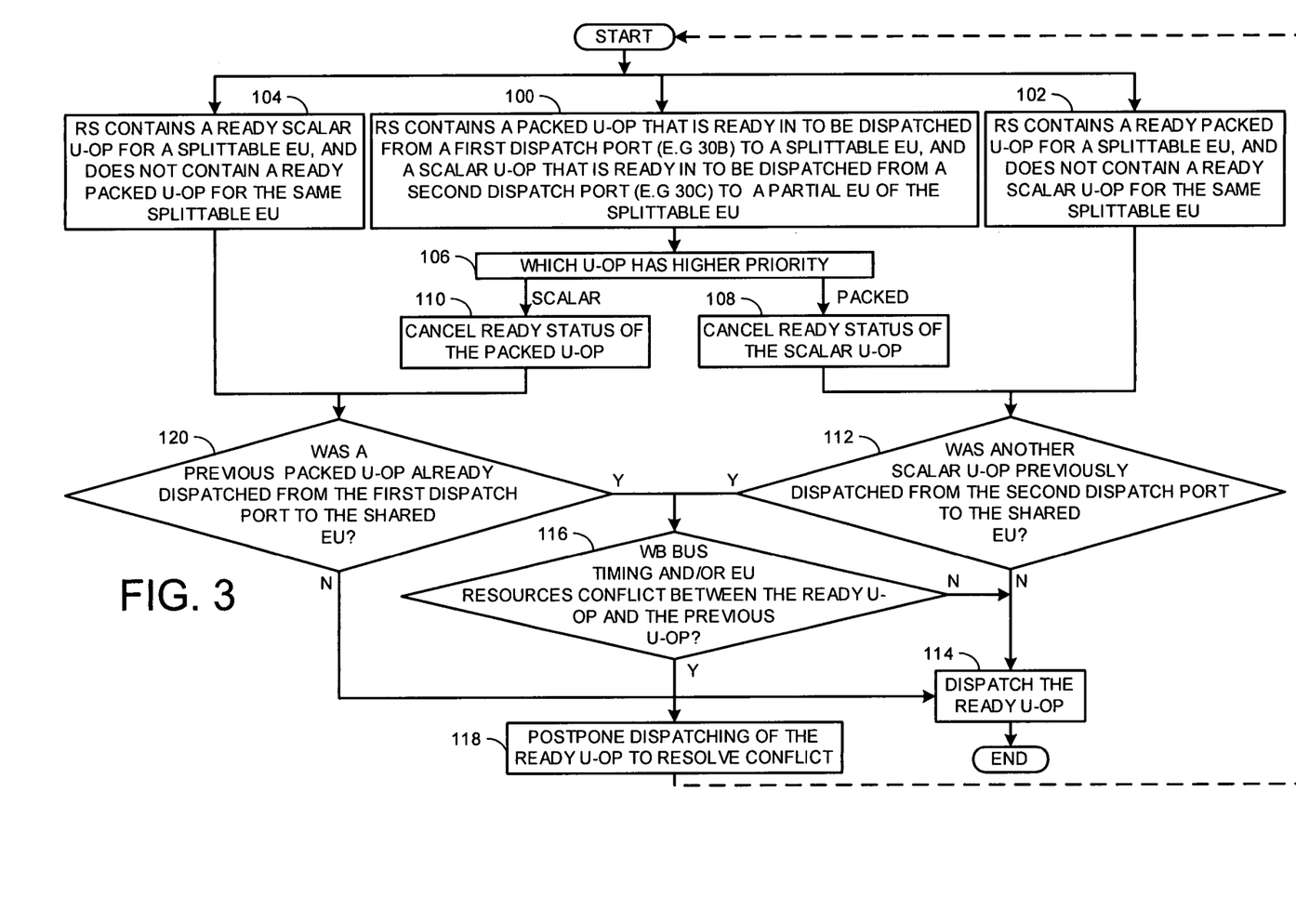
FIG. 3 is a simplified flowchart diagram of an exemplary method to resolve potential resource conflicts in an OOO subsystem of a processor, according to some embodiments of the invention.

FIG. 3 is a simplified flowchart diagram of an exemplary method to resolve potential resource conflicts in an out-of-order subsystem of a processor, according to some embodiments of the invention. The method of FIG. 3 may be executed if one of three initial states, numbered 100, 102 and 104, exist in RS 28.

In initial state 100 of the method, RS 28 may store at least two u-ops that are ready to be dispatched. The first u-op may define one or more packed SSE™ operations on 128-bit arguments, and a first dispatch port (e.g. dispatch port 30B) may be bound to dispatch the first u-op.

A first partial EU of a splittable EU (e.g. FAU 14A1) may be assigned to receive the 64 LSB of the arguments for the first u-op and to generate the 64 LSB of the complete execution result, and a second partial EU of the splittable EU (e.g. FAU 14A2) may be assigned to receive the 64 MSB of the arguments for the first u-op and to generate the 64 MSB of the complete execution result.

The second u-op may define one or more scalar SSE™ operations on 128-bit arguments, and a second dispatch port (e.g. dispatch port 30C) may be bound to dispatch the second u-op. The second partial EU may be assigned to receive the 64 LSB of the arguments for the second u-op and to generate the 64 LSB of the complete execution result, and a bypass EU (e.g. BP_EU 14E) may be assigned to receive the 64 MSB of the arguments for the first u-op and to generate the 64 MSB of the complete execution result.

RS 28 is able to concurrently dispatch the first and the second u-ops from the two dispatch ports. However, if concurrently dispatched from RS 28, both ready u-ops may require concurrent usage of the second partial EU and/or its WB bus (e.g. WB bus 34A2), and the second partial EU and/or its WB bus may not be able to concurrently serve both u-ops.

Both ready u-ops may be assigned priorities (106), and the "ready to be dispatched" status of the lower priority one may be canceled. Consequently, RS 28 may not dispatch the u-op that's "ready to be dispatched" status was canceled. If the first u-op has the higher priority, the ready status of the second u-op may be canceled (108), and if the second u-op has the higher priority, the ready status of the first u-op may be canceled (110).

In initial state 102 of the method, RS 28 may store the first (packed) ready u-op but, if RS 28 stores the second (scalar) u-op, the second u-op doesn't have a ready status. In initial state 104 of the method, RS 28 may store the second ready u-op but, if RS 28 stores the first u-op, the first u-op doesn't have a ready status.

If RS 28 stores the first (packed) ready u-op but does not store the second (scalar) u-op in a ready status (after box 102 or after box 108), RS 28 may verify whether another u-op, that defines one or more scalar SSE™ operations on 128-bit arguments, was previously dispatched to the second partial EU and whether an execution result of such other u-op has not yet propagated through the appropriate WB bus (e.g. WB bus 34A2). If the answer is "no" (112), RS 28 may dispatch the first (packed) ready u-op (114), and the method may exit. Otherwise, RS 28 may verify whether the first (packed) ready u-op, if dispatched, may require the use of the second partial EU (e.g. FAU 14A2) concurrently with the previously dispatched u-op or may require the use of the corresponding WB bus (e.g. WB bus 34A2) concurrently with the previously dispatched u-op. If the answer is "no" (116), RS 28 may dispatch the first (packed) ready u-op (114), and the method may exit. Otherwise, RS 28 may postpone dispatching the first (packed) ready u-op (118) to avoid the resources conflict, and the method may re-start.

If RS 28 stores the second (scalar) ready u-op but does not store the first (packed) u-op in a ready status (after box 104 or after box 110), RS 28 may verify whether another u-op, that defines one or more packed SSE™ operations on 128-bit arguments, was previously dispatched to the first and second partial EUs and whether an execution result of such other u-op has not yet propagated through the appropriate WB buses (e.g. WB buses 34A1 and 34A2). If the answer is "no" (120), RS 28 may dispatch the second (scalar) ready u-op (114), and the method may exit. Otherwise, RS 28 may verify whether the second (scalar) ready u-op, if dispatched, may require the use of the second partial EU (e.g. FAU 14A2) concurrently with the previously dispatched u-op or may require the use of the corresponding WB bus (e.g. WB bus 34A2) concurrently with the previously dispatched u-op. If the answer is "no" (116), RS 28 may dispatch the second (scalar) ready u-op (114), and the method may exit. Otherwise, RS 28 may postpone dispatching the second (scalar) ready u-op (118) to avoid the resources conflict, and the method may re-start.

It should be understood, that the order of execution of boxes 106, 108, 110, 112, 114, 116 and 118, as described in FIG. 3, is only exemplary. Any other order is possible and is included in embodiments of the invention. For example, boxes 112, 116, 118 and 120 can be executed before the determination whether to cancel the "ready to be dispatched" status of a u-op, as reflected in boxes 100, 106, 108 and 110.

Resolving Potential Future Resource Conflicts at EU Assignment Level

Figure 4:
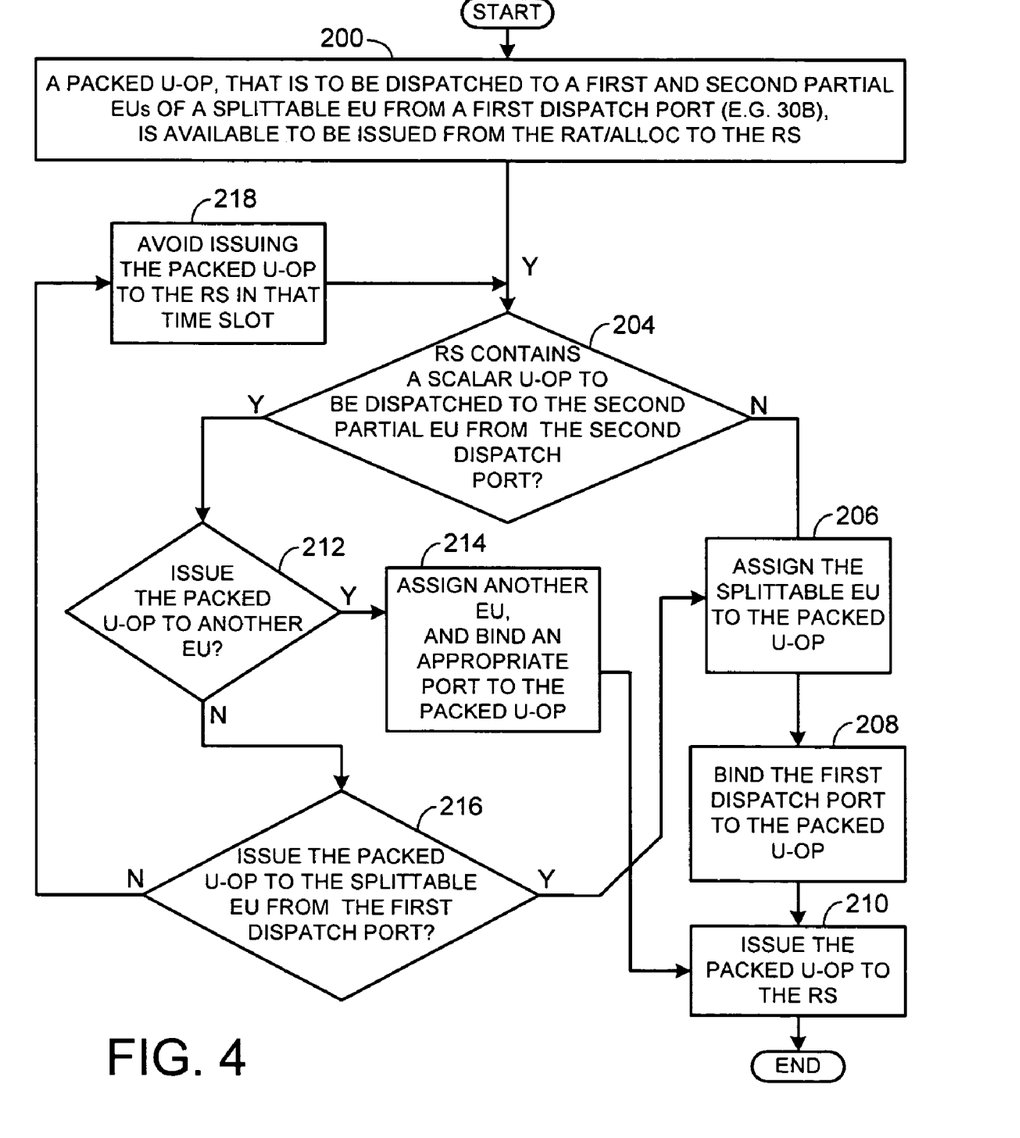
FIG. 4 is a simplified flowchart diagram of another exemplary method to resolve potential resource conflicts in an OOO subsystem of a processor, according to some embodiments of the invention.

FIG. 4 is a simplified flowchart diagram of another exemplary method to resolve potential resource conflicts in an out-of-order subsystem of a processor, according to some embodiments of the invention. The method of FIG. 4 may be executed if an initial state numbered 200 exists in RAT/ALLOC 24.

In initial state 200, RAT/ALLOC 24 may store a first u-op that defines one or more packed SSE™ operations on 128-bit arguments. The first u-op may be such, that a first partial EU of a splittable EU (e.g. FAU 14A1) can be assigned to receive the 64 LSB of the arguments for the first u-op from a first dispatch port (e.g. dispatch port 30B) and to generate the 64 LSB of the complete execution result, and a second partial EU of the splittable EU (e.g. FAU 14A2) can be assigned to receive the 64 MSB of the arguments for the first u-op from the first dispatch port and to generate the 64 MSB of the complete execution result.

In addition, in initial state 200, RAT/ALLOC 24 may have a preference to assign the splittable EU and to bind the first dispatch port (e.g. dispatch port 30B) to the first u-op. Such a preference may result from, for example, work load leveling between the different dispatch ports 30 and/or the different EUs 14.

The method may continue to box 204. In box 204, RAT/ALLOC 24 may verify whether RS 28 already contains a second u-op that defines one or more scalar SSE™ operations on 128-bit arguments, and that the second partial EU of the same splittable EU (e.g. FAU 14A2) is assigned to receive the 64 LSB of the arguments for the second u-op from a second dispatch port (e.g. dispatch port 30C) and to generate the 64 LSB of the complete execution result of the second u-op.

If RS 28 does not contain such a second u-op, RAT/ALLOC 24 may assign the splittable EU (e.g. FAU 14A) to the first u-op (206), may bind the first dispatch port (e.g. dispatch port 30B) to the first u-op (208), and may issue the first packed u-op to RS 28 (210).

However, if RS 28 does contain such a second u-op, RAT/ALLOC 24 may select one of several alternative options instead of assigning the splittable EU to the first u-op. Selection of one of the alternative options may help avoiding possible future conflict between the first and the second u-ops over the second partial EU of the splittable EU (e.g. FAU 14A2) or over the corresponding WB bus (e.g. WB bus 32A2). In addition, selection of one of the alternative options may preclude a need to cancel a "ready to be dispatched" status of the first or the second u-op or to postpone dispatching of the first or the second u-op from RS 28, as demonstrated in the method of FIG. 3.

One exemplary option is to issue the first u-op to another appropriate EU. If this option is selected (212), RAT/ALLOC 24 may assign the other EU to execute the first u-op, may bind an appropriate dispatch port to the u-op (214), and may issue the first u-op to RS 28 (210). Then, the method may terminate.

In another exemplary option, RAT/ALLOC 24 may decide to issue the first u-op to RS 28 with the first and second partial EUs (e.g. FAU 14A1 and FAU 14A2) assigned to execute the first u-op, although a possible future conflict over resources may occur between the first and the second u-op (216). The method may execute boxes 206, 208 and 210, and may terminate. If this option is selected, a possible conflict over resources may later be resolved by the method of FIG. 3.

In a yet another exemplary option, RAT/ALLOC 24 may decide not to issue the first u-op at the coming time slot available to issue u-ops to RS 28 (216), and may avoid issuing the first u-op at the coming time slot available to issue u-ops to RS 28 (218). The method may continue to box 204).

It should be understood, that the order of execution of boxes 204, 206, 208, 210, 212, 216 and 218, as described in FIG. 4, is only exemplary. Any other order is possible and is included in embodiments of the invention.

Figure 5:
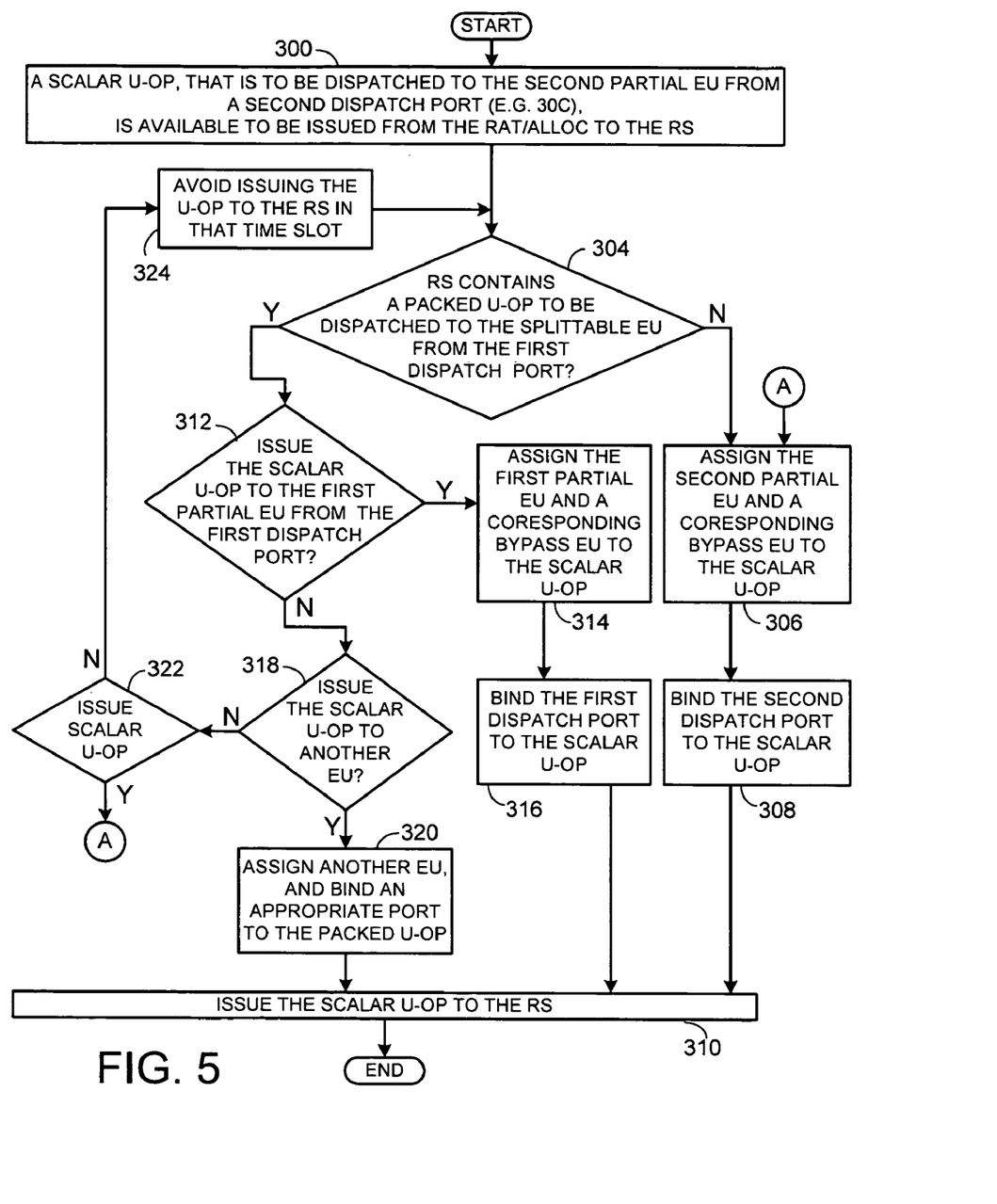
FIG. 5 is a simplified flowchart diagram of a yet another exemplary method to resolve potential resource conflicts in an OOO subsystem of a processor, according to some embodiments of the invention.

FIG. 5 is a simplified flowchart diagram of a yet another exemplary method to resolve potential resource conflicts in an out-of-order subsystem of a processor, according to some embodiments of the invention. The method of FIG. 5 may be executed if an initial state numbered 300 exists in RAT/ALLOC 24.

In initial state 300, RAT/ALLOC 24 may store a first u-op that defines one or more scalar SSE™ operations on 128-bit arguments. The first u-op may be such, that any one of a first and a second partial EUs of a splittable EU (e.g. FAU 14A1 or FAU 14A2, respectively) can be assigned to receive the 64 LSB of the arguments for the first u-op and to generate the 64 LSB of the complete execution result, and a respective bypass EU (e.g. BP_EU 14C or BP_EU 14E, respectively) can be assigned to receive the 64 MSB of the arguments for the first u-op and to generate the 64 MSB of the complete execution result. The first u-op can be dispatched to the first partial EU and the respective bypass EU from a first dispatch port (e.g. dispatch port 30B), and can be dispatched to the second partial EU and the respective bypass EU from a second dispatch port (e.g. dispatch port 30C).

In addition, in initial state 300, RAT/ALLOC 24 may have a preference to assign the second partial EU (e.g. FAU 14A2) to receive the 64 LSB of the arguments for the first u-op, and to bind the second dispatch port (e.g. dispatch port 30C) to the first u-op. Such a preference may result from, for example, work load leveling between the different dispatch ports 30 and/or the different EUs 14.

The method may continue to box 304. In box 304, RAT/ALLOC 24 may verify whether RS 28 already contains a second u-op, that defines one or more packed SSE™ operations on 128-bit arguments, and that the second partial EU of the same splittable EU (e.g. FAU 14A2) is assigned to receive the 64 LSB of the arguments for the second u-op and to generate the 64 LSB of the complete execution result of the second u-op.

If RS 28 does not contain such a second u-op, RAT/ALLOC 24 may assign the second partial EU (e.g. FAU 14A2) and the corresponding bypass EU to the first u-op (306), may bind the second dispatch port (e.g. dispatch port 30C) to the first u-op (308), and may issue the first u-op to RS 28 (310).

However, if RS 28 does contain such a second u-op, RAT/ALLOC 24 may select one of several options in order to avoid possible future conflict between the first and the second u-ops over the second partial EU (e.g. FAU 14A2) or over the corresponding WB bus (e.g. WB bus 32A2).

One exemplary option is to issue the first u-op to the second partial EU (e.g. FAU 14A2) and the corresponding bypass EU. If this option is selected (312), RAT/ALLOC 24 may assign the first partial EU (e.g. FAU 14A1) and the corresponding bypass EU to the first u-op (314), may bind the first dispatch port (e.g. dispatch port 30B) to the first u-op (316), and may issue the first u-op to RS 28 (310).

In another exemplary option, RAT/ALLOC 24 may decide to issue the first u-op to another appropriate EU. If this option is selected (318), RAT/ALLOC 24 may assign the other EU to execute the first u-op, may bind an appropriate dispatch port to the u-op (320), and may issue the first u-op to RS 28 (310). The method may terminate.

In a yet another exemplary option, RAT/ALLOC 24 may decide to issue the first u-op to RS 28 with the second partial EU (e.g. FAU 14A2) and the corresponding bypass EU assigned to execute the first u-op, although a possible future conflict over resources may occur between the first and the second u-op (322). The method may execute boxes 306, 308 and 310, and may terminate. If this option is selected, a possible conflict over resources may later be resolved by the method of FIG. 3.

In a further exemplary option, RAT/ALLOC 24 may decide not to issue the first u-op at the coming time slot available to issue u-ops to RS 28 (322), and may avoid issuing the first u-op at the coming time slot available to issue u-ops to RS 28 (324). The method may continue to box 304.

It should be understood, that the order of execution of boxes 304, 306, 308, 310, 312, 314, 316, 318, 320, 322 and 324, as described in FIG. 5, is only exemplary. Any other order is possible and is included in embodiments of the invention.

Balancing Execution Load of Non-Pipelined U-Ops

Figure 6:
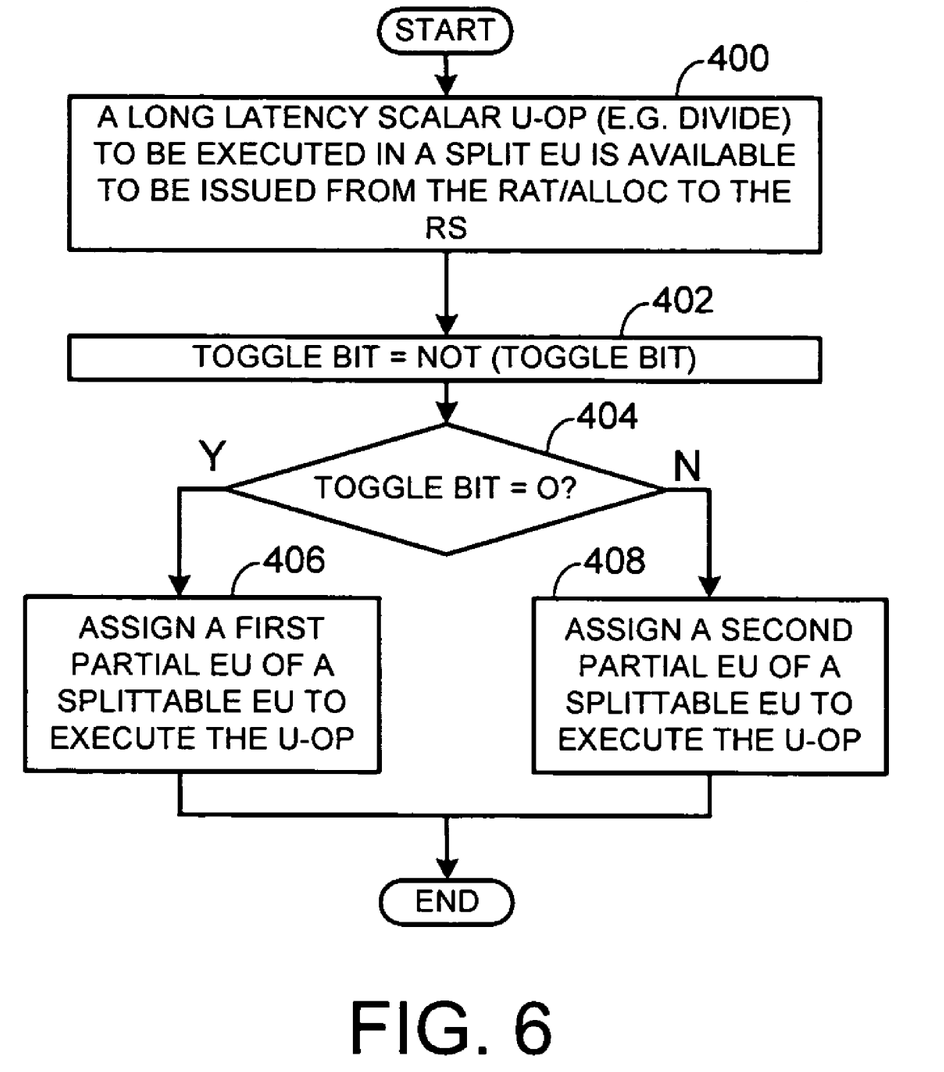
FIG. 6 is a simplified flowchart diagram of an exemplary method to level execution load of long latency u-ops on partial EUs of a splittable EU, according to some embodiments of the invention.

FIG. 6 is a simplified flowchart diagram of an exemplary method to balance the execution load of non-pipelined u-ops on partial EUs of a splittable EU, according to some embodiments of the invention. As described hereinabove for the methods of FIGS. 4 and 5, assignment of partial EUs by RAT/ALLOC 24 to execute u-ops that define one or more scalar SSE™ operations on 128-bit arguments may be flexible.

The latency (execution time of an individual u-op) of u-ops that define operations such as addition, subtraction or multiplication, may be relatively short (for example—three to five cycles of clock 26), and in addition, short latency u-ops may be fully pipelined. As a result, the effective execution time of u-ops in a stream of short latency, fully pipelined u-ops may be one to two cycles of clock 26.

In contrast, the latency of u-ops that define operations such as division and square root may have a relatively longer latency (for example—20 cycles of clock 26), and long latency u-ops may not be fully pipelined. As a result, the effective execution time of u-ops in a stream of long latency, non pipelined u-ops may be on the order of the latency itself.

Therefore, a method used for assigning partial EUs to execute non-pipelined u-ops may have a relatively high impact on the performance of processor 4.

For example, if four division u-ops are routed one after the other to FMUL 14B1, their total execution time may be, according to the example, 80 cycles of clock 26. During that time, execution of short latency, pipelined u-ops in FMUL 14B1 may not be possible, and as a result, possible stalls may occur in OOO sub-system 18. For example, a u-op may require an execution result of a short latency u-op as an operand, dispatching of the short latency u-op may be delayed by 80 cycles of clock 26 because of back to back execution of such long latency u-ops, and a stall may occur.

However, if the first and the third division u-ops are routed to FMUL 14B1 and the second and the fourth division u-ops are routed to FMUL 14B2, each of the FMULs may be occupied, according to the example, for only 40 cycles of clock 26, and therefore, possible stalls may be shorter.

According to some embodiments of the invention, the load on dispatch ports coupled to partial EUs due to binding of non-pipelined u-ops is balanced separately from the load on the dispatch ports due to binding of pipelined u-ops. For example, as shown in FIG. 6, RAT/ALLOC 24 may assign partial EUs to execute non-pipelined u-ops in an alternating fashion. A "toggle bit" is used to explain this concept if FIG. 6, although any other implementation of alternating assignment of partial EUs is possible.

The method of FIG. 6 may be executed if an initial state numbered (400) exists in RAT/ALLOC 24. In initial state

400 of the method, RAT/ALLOC 24 may store a long latency non-pipelined u-op that defines one or more scalar SSE™ operations on 128-bit arguments. The toggle bit may be able to one of two logical values—"0" and "1". The method may negate the value of the toggle bit (402).

If the new value of the toggle bit is "0" (404), RAT/ALLOC 24 may assign a first partial EU of a splittable EU (e.g. FMUL 14B1) to execute the u-op (406). If the new value of the toggle bit is "1", RAT/ALLOC 24 may assign a second partial EU of a splittable EU (e.g. FMUL 14B2) to execute the u-op (408).

Independent Routing of Partial Execution Results

Reference is now made back to FIG. 2. Processor 4 may include layout stacks 50 and 52 that may be non-overlapping physical areas of processor 4. Layout stack 50 may contain FAU 14A1, FMUL 14B1, WB bus 34A1 and WB bus 34B1, and may optionally contain delay buffers 38A1 and 38B1. Layout stack 52 may contain FAU 14A2, FMUL 14B2, WB bus 34A2 and WB bus 34B2, and may optionally contain delay buffers 38A2 and 38B2.

In an exemplary situation, RS 28 may store two u-ops that define one or more operations on 128-bit arguments of SSE™ data type. One or more execution units of OOO subsystem 18 may be assigned to execute the first u-op, and one or more execution units of OOO subsystem 18 may be assigned to execute the second u-op. In addition, execution result of the first u-op may be an argument for the second u-op.

The status of the first u-op may be "not ready to be dispatched" until the one or more arguments for the first u-op are available to be routed to the assigned EUs. After the status of the first u-op becomes "ready to be dispatched", RS 28 may dispatch the first u-op. The status of the second u-op may become "ready to be dispatched" when the execution result of the first u-op becomes ready to be routed to the one or more EUs assigned to the second u-op.

RS 28 may control OOO subsystem 18 so that the execution result of the first u-op is received by the one or more EUs that are assigned to the second u-op while these EUs receive the second u-op. In some cases, a complete execution result of the first u-op may be routed as a whole through resources that are external to the layout stacks. However, in other cases, part of the execution result of the first u-op may be routed internally to one of the layout stack.

In a first example, the first u-op may define one or more scalar SSE™ operations on 128-bit arguments, and the second u-op may define one or more packed SSE™ operations on 128-bit arguments. FAU 14A2 and BP_EU 14E may be assigned to the first u-op, and FAU 14A1 and FAU 14A2 may be assigned to the second u-op. RS 28 may route the complete execution result of the first u-op from DWB bus 40C to 14A1 and FAU 14A2 through routing blocks 48.

However, if FAU 14A1 and BP_EU 14C are assigned to the first u-op, RS 28 may route one partial execution result of the first u-op from FAU 14A1 back the FAU 14A1 through WB bus 34A1, and may route the complementary partial execution result of the first u-op from BP_EU 14C to FAU 14A2 through BP buses 36 and routing blocks 48.

In another example, the first u-op may define one or more packed SSE™ operations on 128-bit arguments, and the second u-op may define one or more scalar SSE™ operations on 128-bit arguments. FAU 14A1 and FAU 14A2 may be assigned to the first u-op, and FAU 14A1 and BP_EU 14E may be assigned to the second u-op. RS 28 may route the complete execution result of the first u-op from DWB bus 40C to 14A1 and FAU 14A2 through routing blocks 48.

However, if FAU 14A1 and BP_EU 14C are assigned to the second u-op, RS 28 may route one partial execution result of the first u-op from FAU 14A1 back the FAU 14A1 through WB bus 34A1, and may route the complementary partial execution result of the first u-op from FAU 14A2 back to FAU 14A2 through DWB bus 40A and routing blocks 48.

In a yet another example, the first and the second u-ops may both define one or more scalar SSE™ operations on 128-bit arguments. FAU 14A2 and BP_EU 14E may be assigned to the first u-op, and FAU 14A1 and BP_EU 14C may be assigned to the second u-op. RS 28 may route the complete execution result of the first u-op from DWB bus 40A to 14A1 and FAU 14A2 through routing blocks 48.

However, if FAU 14A2 and BP_EU 14E are assigned to the second u-op, RS 28 may route one partial execution result of the first u-op from FAU 14A2 back the FAU 14A2 through WB bus 34A2, and may route the complementary partial execution result of the first u-op from BP_EU 14E back to BP_EU 14E through BP buses 36 and routing blocks 48.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A processor comprising:
   a splittable execution unit having first and second partial execution units;
   a first bypass execution unit;
   routing circuitry to route a first portion of one or more arguments of a first micro-operation to said first partial execution unit and to route a complementary second portion of one of said one or more arguments of said first micro-operation to said first bypass execution unit; and
   a first delayed write-back bus to carry, as a full execution result of said first micro-operation, a first partial execution result of said first micro-operation generated by said first partial execution unit and a second partial execution result of said first micro-operation outputted by said first bypass execution unit.

2. The processor of claim 1, wherein said first parts include one or more integer values and said first and second partial execution units are integer execution units.

3. The processor of claim 1, wherein said first parts include one or more floating point values and said first and second partial execution units are floating point execution units.

4. The processor of claim 1, wherein said first delayed write-back bus is able to route said full execution result of said first micro-operation to said routing circuitry.

5. The processor of claim 1, further comprising:
   a reservation station; and
   a re-order buffer,
   wherein said first delayed write-back bus is able to route said full execution result of said first micro-operation to one or more of said routing circuitry, said reservation station and said re-order buffer.

6. The processor of claim 1, further comprising:
   a first bypass bus to carry said second partial execution result of said first micro-operation directly from said first bypass execution unit to said routing circuitry.

7. The processor of claim 1, wherein said second partial execution result of said first micro-operation is a delayed version of said complementary second portion of said one of said one or more arguments of said first micro-operation.

8. The processor of claim 1, further comprising:
a second bypass execution unit, wherein said routing circuitry is to route a first portion of one or more arguments of a second micro-operation to said second partial execution unit and to route a complementary second portion of one of said one or more arguments of said second micro-operation to said second bypass execution unit; and
a second delayed write-back bus to carry, as a full execution result of said second micro-operation, a first partial execution result of said second micro-operation generated by said second partial execution unit and a second partial execution result of said second micro-operation outputted by said second bypass execution unit.

9. The processor of claim 8, wherein said second delayed write-back bus is able to route said full execution result of said second micro-operation to said routing circuitry.

10. The processor of claim 8, further comprising:
a reservation station; and
a re-order buffer,
wherein said first delayed write-back bus is able to route said full execution result of said first micro-operation to one or more of said routing circuitry, reservation station and said re-order buffer, and
wherein said second delayed write-back bus is able to route said full execution result of said second micro-operation to one or more of said routing circuitry, reservation station and said re-order buffer.

11. The processor of claim 8, further comprising:
a second bypass bus to carry said second partial execution result of said second micro-operation directly from said second bypass execution unit to said routing circuitry.

12. The processor of claim 8, wherein said second partial execution result of said second micro-operation is a delayed version of said complementary second portion of said one of said one or more arguments of said second micro-operation.

13. The processor of claim 8, wherein said first partial execution unit is to perform an operation of said first micro-operation and said second partial execution unit is to perform an operation of said second micro-operation at least partially concurrently.

14. The processor of claim 8, wherein an operation of said first micro-operation performed by said first partial execution unit differs from an operation of said second micro-operation performed by said second partial execution unit.

15. A processor comprising:
a reservation station to dispatch micro-operations through dispatch ports to execution units via routing circuitry; and
a splittable execution unit, having a first partial execution unit and a second partial execution unit, said splittable execution unit coupled to two or more of said dispatch ports via said routing circuitry,
wherein said reservation station is to control said routing circuitry so that in the event of dispatch through one of said dispatch ports of a micro-operation to be performed in said splittable execution unit, a less significant portion of arguments of said micro-operation is routed to said first partial execution unit and a complementary most significant portion of said arguments is routed to said second partial execution unit.

16. The processor of claim 15, further comprising:
a first bypass execution unit coupled to said reservation station via said routing circuitry,
wherein said reservation station is to control said routing circuitry so that in the event of dispatch through one of said dispatch ports of a first scalar micro-operation, a less significant portion of arguments of said scalar micro-operation is routed to said first partial execution unit to generate a first partial execution result of said first scalar micro-operation, a complementary most significant portion of said arguments is routed to said first bypass execution unit to generate a second partial execution result of said first scalar micro-operation, and
wherein said first partial execution result and said second partial execution result are to be combined into a full execution result of said first scalar micro-operation.

17. The processor of claim 16, further comprising:
a second bypass execution unit coupled to said reservation station via said routing circuitry,
wherein said reservation station is to control said routing circuitry so that in the event of dispatch through another of said dispatch ports of a second scalar micro-operation, a less significant portion of arguments of said second scalar micro-operation is routed to said second partial execution unit to generate a first partial execution result of said second scalar micro-operation, a complementary most significant portion of said arguments of said second scalar micro-operation is routed to said second bypass execution unit to generate a second partial execution result of said second scalar micro-operation, and
wherein said first partial execution result of said second scalar micro-operation and said second partial execution result of said second scalar micro-operation are to be combined into a full execution result of said second scalar micro-operation.

18. An apparatus comprising a processor, the processor includes:
a splittable execution unit having first and second partial execution units;
a first bypass execution unit;
routing circuitry to route a first portion of one or more arguments of a first micro-operation to said first partial execution unit and to route a complementary second portion of one of said one or more arguments of said first micro-operation to said first bypass execution unit; and
a first delayed write-back bus to carry, as a full execution result of said first micro-operation, a first partial execution result of said first micro-operation generated by said first partial execution unit and a second partial execution result of said first micro-operation outputted by said first bypass execution unit.

19. The apparatus of claim 18, wherein said first parts include one or more integer values and said first and second partial execution units are integer execution units.

20. The apparatus of claim 18, wherein said first parts include one or more floating point values and said first and second partial execution units are floating point execution units.

21. The apparatus of claim 18, wherein said first delayed write-back bus is able to route said full execution result of said first micro-operation to said routing circuitry.

22. The apparatus of claim 18, wherein the processor further comprising:
a reservation station; and
a re-order buffer, wherein said first delayed write-back bus is able to route said full execution result of said first micro-operation to one or more of said routing circuitry, said reservation station and said re-order buffer.

23. The apparatus of claim 18, wherein the processor further comprising:
a first bypass bus to carry said second partial execution result of said first micro-operation directly from said first bypass execution unit to said routing circuitry.

24. The apparatus of claim 18, wherein said second partial execution result of said first micro-operation is a delayed version of said complementary second portion of said one of said one or more arguments of said first micro-operation.

25. The apparatus of claim 18, wherein the processor further comprising:
a second bypass execution unit, wherein said routing circuitry is to route a first portion of one or more arguments of a second micro-operation to said second partial execution unit and to route a complementary second portion of one of said one or more arguments of said second micro-operation to said second bypass execution unit; and
a second delayed write-back bus to carry, as a full execution result of said second micro-operation, a first partial execution result of said second micro-operation generated by said second partial execution unit and a second partial execution result of said second micro-operation outputted by said second bypass execution unit.

26. The apparatus of claim 25, wherein said second delayed write-back bus is able to route said full execution result of said second micro-operation to said routing circuitry.

27. The apparatus of claim 25, wherein the processor further comprising:
a reservation station; and
a re-order buffer,
wherein said first delayed write-back bus is able to route said full execution result of said first micro-operation to one or more of said routing circuitry, reservation station and said re-order buffer, and
wherein said second delayed write-back bus is able to route said full execution result of said second micro-operation to one or more of said routing circuitry, reservation station and said re-order buffer.

28. The apparatus of claim 25, wherein the processor further comprising:
a second bypass bus to carry said second partial execution result of said second micro-operation directly from said second bypass execution unit to said routing circuitry.

29. The apparatus of claim 25, wherein said second partial execution result of said second micro-operation is a delayed version of said complementary second portion of said one of said one or more arguments of said second micro-operation.

30. The apparatus of claim 25, wherein said first partial execution unit is to perform an operation of said first micro-operation and said second partial execution unit is to perform an operation of said second micro-operation at least partially concurrently.

31. The apparatus of claim 25, wherein an operation of said first micro-operation performed by said first partial execution unit differs from an operation of said second micro-operation performed by said second partial execution unit.

32. The apparatus of claim 18, wherein said apparatus is a computer.

33. The apparatus of claim 18, wherein said apparatus further comprises a voltage monitor.

34. An apparatus comprising a processor, the processor includes:
a reservation station to dispatch micro-operations through dispatch ports to execution units via routing circuitry; and
a splittable execution unit, having a first partial execution unit and a second partial execution unit, said splittable execution unit coupled to two or more of said dispatch ports via said routing circuitry,
wherein said reservation station is to control said routing circuitry so that in the event of dispatch through one of said dispatch ports of a micro-operation to be performed in said splittable execution unit, a less significant portion of arguments of said micro-operation is routed to said first partial execution unit and a complementary most significant portion of said arguments is routed to said second partial execution unit.

35. The apparatus of claim 34, wherein the processor further comprising:
a first bypass execution unit coupled to said reservation station via said routing circuitry,
wherein said reservation station is to control said routing circuitry so that in the event of dispatch through one of said dispatch ports of a first scalar micro-operation, a less significant portion of arguments of said scalar micro-operation is routed to said first partial execution unit to generate a first partial execution result of said first scalar micro-operation, a complementary most significant portion of said arguments is routed to said first bypass execution unit to generate a second partial execution result of said first scalar micro-operation, and
wherein said first partial execution result and said second partial execution result are to be combined into a full execution result of said first scalar micro-operation.

36. The apparatus of claim 35, wherein the processor further comprising:
a second bypass execution unit coupled to said reservation station via said routing circuitry,
wherein said reservation station is to control said routing circuitry so that in the event of dispatch through another of said dispatch ports of a second scalar micro-operation, a less significant portion of arguments of said second scalar micro-operation is routed to said second partial execution unit to generate a first partial execution result of said second scalar micro-operation, a complementary most significant portion of said arguments of said second scalar micro-operation is routed to said second bypass execution unit to generate a second partial execution result of said second scalar micro-operation, and
wherein said first partial execution result of said second scalar micro-operation and said second partial execution result of said second scalar micro-operation are to be combined into a full execution result of said second scalar micro-operation.

37. The apparatus of claim 34, wherein said apparatus is a computer.

38. The apparatus of claim 34, wherein said apparatus further comprises a voltage monitor.

* * * * *